United States Patent
Colby et al.

(10) Patent No.: US 10,336,140 B2
(45) Date of Patent: Jul. 2, 2019

(54) PROJECTING FEATURES MOLDED WITHIN SUBMERGED TREAD VOIDS

(75) Inventors: E. Bruce Colby, Greenville, SC (US); Dimitri G. Tsihlas, Greer, SC (US); Zarak E. Cesar, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 652 days.

(21) Appl. No.: 14/374,818

(22) PCT Filed: Jan. 31, 2012

(86) PCT No.: PCT/US2012/023412
§ 371 (c)(1),
(2), (4) Date: Jul. 25, 2014

(87) PCT Pub. No.: WO2013/115810
PCT Pub. Date: Aug. 8, 2013

(65) Prior Publication Data
US 2014/0367011 A1    Dec. 18, 2014

(51) Int. Cl.
*B60C 11/03* (2006.01)
*B60C 11/117* (2006.01)
(Continued)

(52) U.S. Cl.
CPC .......... *B60C 11/032* (2013.01); *B29D 30/52* (2013.01); *B29D 30/56* (2013.01); *B60C 11/02* (2013.01);
(Continued)

(58) Field of Classification Search
CPC ..... B60C 11/0323; B60C 11/02; B60C 11/13; B60C 11/1281; B60C 2011/1338; B29D 2030/061; B29D 30/56
See application file for complete search history.

(56) References Cited

U.S. PATENT DOCUMENTS

| 2,661,041 A | 1/1953 | Walsh |
| 2,960,138 A | 11/1960 | Chiodo |

(Continued)

FOREIGN PATENT DOCUMENTS

| EP | 0610712 A1 | 8/1994 |
| FR | 1498340 A | 10/1967 |

(Continued)

OTHER PUBLICATIONS

Machine translation for Japan 2011-245996 (no date).*

(Continued)

*Primary Examiner* — Steven D Maki
(74) *Attorney, Agent, or Firm* — Hahn Loeser & Parks LLP; Bret A. Hrivnak

(57) ABSTRACT

The present invention concerns tire treads having projecting features comprising wear indicators, stone ejectors, and/or noise suppressors arranged within voids submerged below the top, outer side of a tread. Particular embodiments of the invention provide a tire tread having a submerged void extending into to the tread thickness from the bottom side of the tread to a terminal location spaced below the tread top side, the top side forming a ground-engaging side of the tread. Such embodiments further include a plurality of projecting features arranged within the submerged void below the terminal location of the submerged void, the plurality of projecting features being further arranged in a spaced arrangement along a length of the submerged void, each of the plurality of projecting features extending partially across a width of the submerged void, which may comprise a groove, for example. The invention includes methods of forming the tread and a treaded tire.

7 Claims, 7 Drawing Sheets

(51) Int. Cl.
  *B29D 30/56* (2006.01)
  *B60C 11/02* (2006.01)
  *B60C 11/24* (2006.01)
  *B29D 30/52* (2006.01)
  *B60C 11/13* (2006.01)
  *B29D 30/06* (2006.01)

(52) U.S. Cl.
  CPC .......... *B60C 11/0323* (2013.01); *B60C 11/13* (2013.01); *B60C 11/24* (2013.01); *B29D 2030/061* (2013.01); *B60C 2011/1338* (2013.01)

(56) References Cited

U.S. PATENT DOCUMENTS

| | | | |
|---|---|---|---|
| 3,578,055 A | 5/1971 | French | |
| 3,727,661 A | 4/1973 | Hoke | |
| 3,739,828 A | 6/1973 | Schaevitz | |
| 3,814,160 A | 6/1974 | Creasy | |
| 4,114,671 A | 9/1978 | Maiocchi et al. | |
| 5,115,850 A | 5/1992 | Crump et al. | |
| 5,275,218 A * | 1/1994 | Nakayama | B29D 30/542 152/209.17 |
| 5,445,691 A | 8/1995 | Nakayama et al. | |
| 5,535,798 A | 7/1996 | Nakamura | |
| 5,603,366 A | 2/1997 | Nakayama et al. | |
| 6,016,858 A | 1/2000 | Roesgen et al. | |
| 6,196,288 B1 | 3/2001 | Radulescu et al. | |
| 6,378,583 B1 * | 4/2002 | Fontaine | B60C 11/01 152/209.18 |
| 6,874,552 B2 | 4/2005 | Lopez | |
| 7,011,126 B2 | 3/2006 | Heinen | |
| 7,766,061 B2 | 8/2010 | Mayni et al. | |
| 2003/0047263 A1 * | 3/2003 | Lopez | B29D 30/0606 152/209.22 |
| 2003/0101851 A1 * | 6/2003 | Domange | B29D 30/0606 76/101.1 |
| 2003/0211186 A1 | 11/2003 | Chamoy | |
| 2005/0211351 A1 | 9/2005 | Majumdar et al. | |
| 2006/0137794 A1 | 6/2006 | Nguyen et al. | |
| 2007/0062626 A1 | 3/2007 | Oyama | |
| 2009/0194213 A1 | 8/2009 | Suzuki | |
| 2009/0199944 A1 | 8/2009 | Goto et al. | |
| 2010/0051175 A1 | 3/2010 | Cheateau et al. | |
| 2010/0154953 A1 * | 6/2010 | Kaji | B60C 11/12 152/209.21 |
| 2010/0186858 A1 * | 7/2010 | Gallego | B29D 30/56 152/209.1 |
| 2010/0269967 A1 * | 10/2010 | Maruoka | B60C 9/2006 152/209.16 |
| 2011/0214789 A1 | 9/2011 | Cress et al. | |
| 2011/0277898 A1 | 11/2011 | Barraud et al. | |

FOREIGN PATENT DOCUMENTS

| | | | |
|---|---|---|---|
| GB | 2061837 A | | 5/1981 |
| GB | 2268715 A | | 1/1994 |
| GB | 2330808 A | | 5/1999 |
| JP | 06001114 | | 1/1994 |
| JP | 11-105512 A | * | 4/1999 |
| JP | 2002-219909 A | * | 8/2002 |
| JP | 2006069305 A | | 3/2006 |
| JP | 2008207652 A | | 9/2008 |
| JP | 2010052575 A | | 3/2010 |
| JP | 2010116095 A | | 5/2010 |
| JP | 2010215172 A | | 9/2010 |
| JP | 2010260412 A | | 11/2010 |
| JP | 2010260413 A | | 11/2010 |
| JP | 2011140268 A | | 7/2011 |
| JP | 2011-245996 A | * | 12/2011 |
| NL | 2000322 C2 | * | 5/2008 |
| WO | 9803358 | | 1/1998 |
| WO | 2008066527 A1 | | 6/2008 |
| WO | WO-2010/053478 A1 | * | 5/2010 |
| WO | 2011002448 A1 | | 1/2011 |
| WO | 2011002454 A1 | | 1/2011 |
| WO | 2013095406 A1 | | 6/2013 |

OTHER PUBLICATIONS

Translation for Netherlands 2000322 C2 (no date).*
Machine translation for Japan 11-105512 (no date).*
Machine translation for WO 2010/053478 (Year: 2018).*
Bridgestone, Real Questions Real Answers, vol. 14, Issue 2, 2010, 5 pages, trucktires.com.
PCT/US2012/023412 International Search Report and Written Opinion, May 10, 2012, 15 pages.

* cited by examiner

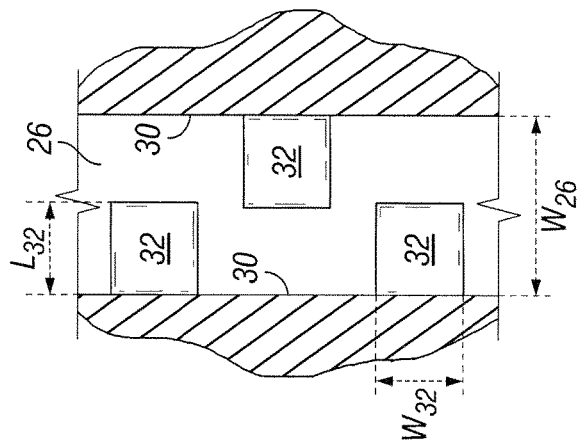
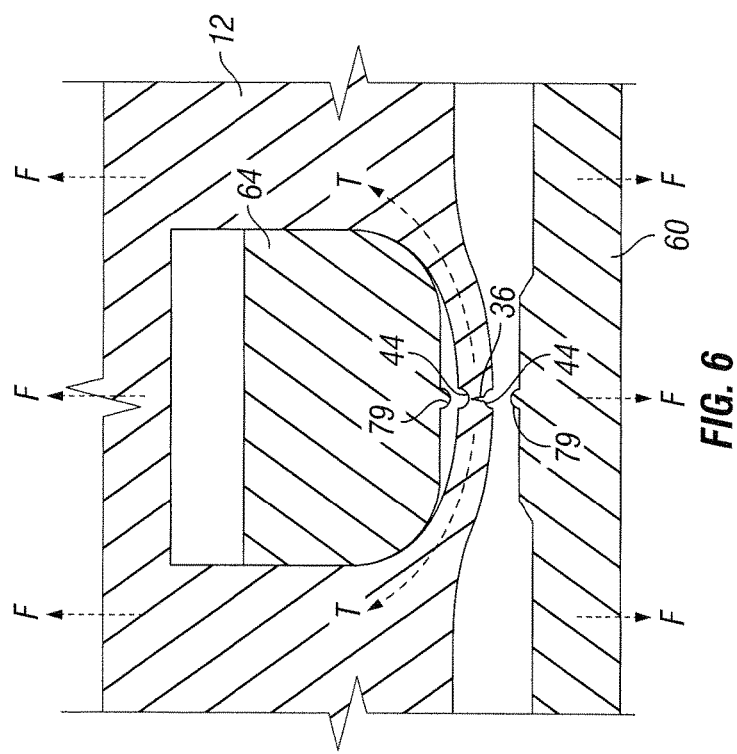
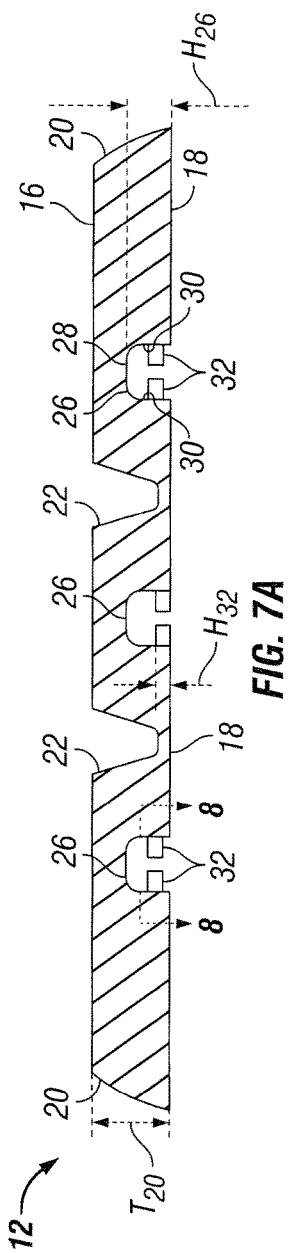
FIG. 7B
FIG. 6
FIG. 7A

PROJECTING FEATURES MOLDED WITHIN SUBMERGED TREAD VOIDS

BACKGROUND OF THE INVENTION

Field of the Invention

This invention relates generally to treads for retreaded tires, and more particularly, to precured treads having projecting features, such as wear indicators, stone ejectors, and/or noise suppressors, formed within a submerged void of a tire tread.

Description of the Related Art

It is known to provide projecting features comprising wear indicators, stone ejectors, and noise suppressors arranged within grooves of a tire tread for motor vehicles, such as for heavy duty truck and trailer tires. For example, such projecting features are commonly located a desired depth within one or more longitudinal grooves arranged along an outer side of the tread. However, there are instances when submerged grooves are arranged within the depth of a tread to create one or more submerged wear layers comprising a different arrangement of tread void that becomes exposed as the tread wears. In these instances, when employing submerged grooves, it may be desirous to employ wear indicators to indicate to an observer that the tread depth has reached its useful life or that only a certain amount of useful tread life remains—without affecting the preceding or upper wear layers of the tread. It may also be desirous to employ stone ejectors in an attempt to prevent or remove stones, pebbles, or other objects that may try to, or become, lodged within a corresponding groove. Furthermore, it may be desirous to provide structure within a groove to reduce noise created by the tread as it rotates and impacts a surface upon which the tire operates, such as a road or ground surface.

SUMMARY OF THE INVENTION

The present invention comprises tire treads having one or more projecting features extending outwardly from a side of a void submerged below a top side of the tread, each of the projecting features extending partially across a width of the submerged void. The present invention also concerns methods for forming such tire treads, including molds there for.

Particular embodiments of the invention comprises a tire tread including a tread thickness bounded depthwise by a top side configured to engage a ground surface during tire operation and a bottom side configured to attach to a tire carcass. The thickness extends laterally between a first side edge and a second side edge and longitudinally in a lengthwise direction of the tread. The tread further includes a submerged void extending into the tread thickness from the bottom side of the tread to a terminal location spaced below the top side. Moreover, the tread includes a plurality of projecting features arranged within the submerged void below the terminal location of the submerged void. The plurality of projecting features are also arranged in a spaced arrangement along a length of the submerged void. Each of the plurality of projecting features extends partially across a width of the submerged void and comprises either a wear indicator, a stone ejector, or a noise suppressor.

Further embodiments of the invention comprises a method of forming a tire tread, which includes the step of providing a mold. Such mold includes at least a first mold portion and a second mold portion operatively positionable together to form a tread-forming cavity there between corresponding to a tire tread. The first mold portion includes a top interior side corresponding to a top side of a tread thickness configured to engage a ground surface during tire operation. The second mold portion includes a bottom interior side corresponding to a bottom side of the tread thickness configured to attach to a tire carcass and a submerged void-forming element projecting outwardly from the bottom interior side and into the tread-forming cavity to a terminal end recessed below the top interior surface to form a corresponding submerged void within the tread thickness. The submerged void-forming element has a plurality of projecting feature-forming cavities extending at least partially into a width of the submerged void-forming element for forming a plurality of corresponding projecting features extending at least partially within a width of a void formed within the tread thickness. A further step of the method includes molding tread material arranged within the tread-forming cavity of the mold to form a molded tread. In particular embodiments, the tread includes a tread thickness bounded depthwise by a top side configured to engage a ground surface during tire operation and a bottom side configured to attach to a tire carcass, the thickness extending laterally between a first side edge and a second side edge and longitudinally in a lengthwise direction of the tread. Such tread further includes a submerged void extending into the tread thickness from the bottom side of the tread to a terminal location recessed below the top side. Moreover, the tread includes a plurality of projecting features arranged within the submerged void below the terminal location of the submerged void, the plurality of projecting features being further arranged in a spaced arrangement along a length of the submerged void, each of the plurality of projecting features extending partially across a width of the submerged void and comprise either a wear indicator, a stone ejector, or a noise suppressor.

In further embodiments, the invention comprises a mold for forming any tread discussed above and contemplated herein. Particular embodiments comprise the mold described in the preceding paragraph.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

FIG. 1 is a front sectioned partial perspective view of a retreaded tire comprising a tread arranged atop a tire carcass, the tread including lateral and longitudinal grooves and submerged voids comprising submerged longitudinal grooves having projecting features comprising wear indicators extending partially across a width of the submerged longitudinal groove in accordance with a particular embodiment of the invention.

FIG. 6 is a front sectional view of a tread being de-molded from a molding having a submerged void-forming element, the de-molding operation being shown to initiate a fracture along a continuous projecting feature comprising a wear indicator to ultimately allow the submerged void-forming element to pass through the continuous projecting feature when the fracture extends fully through a cross-section of the projecting feature to form a discontinuity along a length of the projecting feature.

FIG. 7A is a front sectional view of a tread for a retreaded tire having projecting features comprising stone ejectors each extending partially across a width of a submerged longitudinal groove in accordance with a particular embodiment of the invention.

FIG. 7B is a top view of a stone ejector shown in Section 7B in FIG. 7A.

Figure 8A:
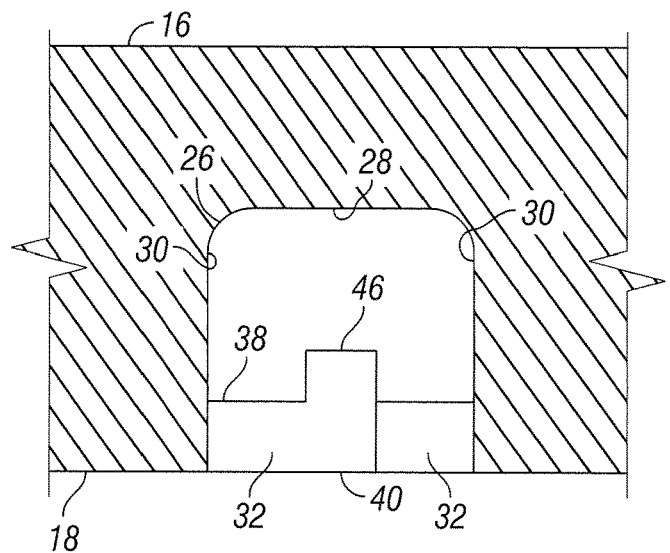

FIG. 8A is a front sectional view of a further embodiment of the tread of FIG. 7A, where an upward or raised projection extends upwardly from a top side of the stone ejector.

Figure 8B:
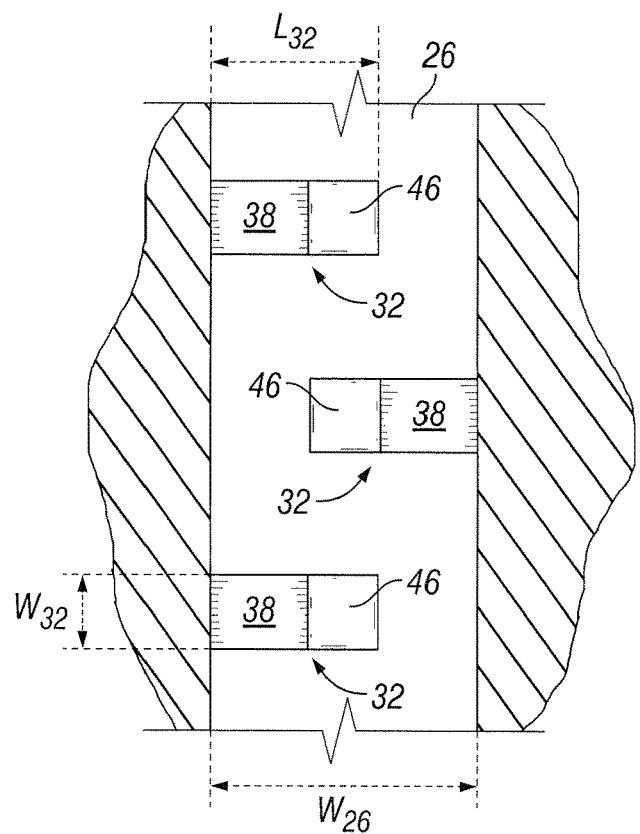

FIG. 8B is a top view of a stone ejector shown in Section 8B in FIG. 8A.

Figure 4:
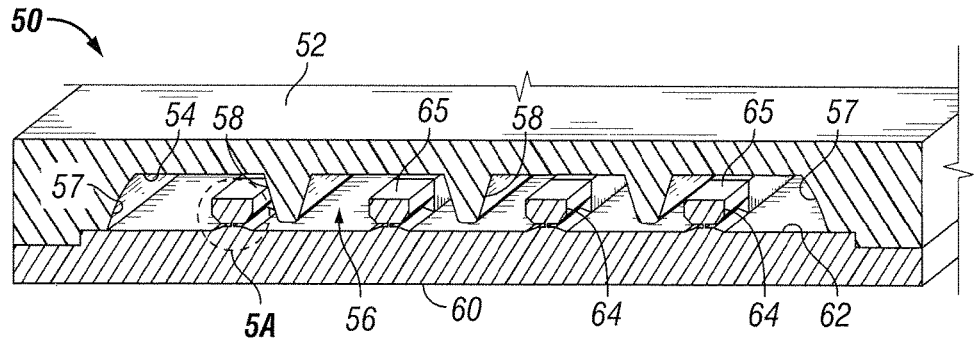
FIG. 4 is mold having a top portion and a bottom portion forming a tread-forming cavity for molding and shaping the tread shown in FIG. 1 according to a particular embodiment of the invention.
Figure 9:
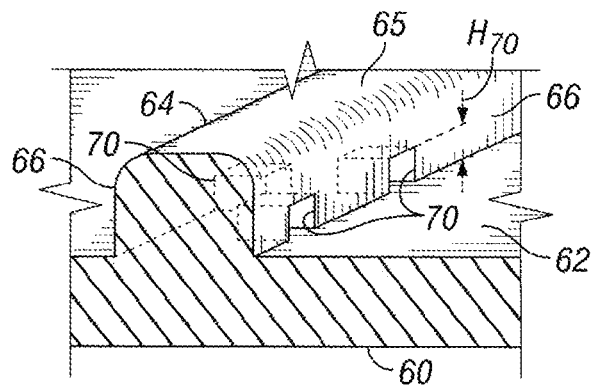

FIG. 9 is a top perspective view of an alternative groove-forming element for use in a mold shown in FIG. 4 according to a particular embodiment of the invention, the groove-forming element having a pair of spaced-apart cavities extending into a width of the groove-forming element from opposing sides of the groove-forming element.

Figure 10:
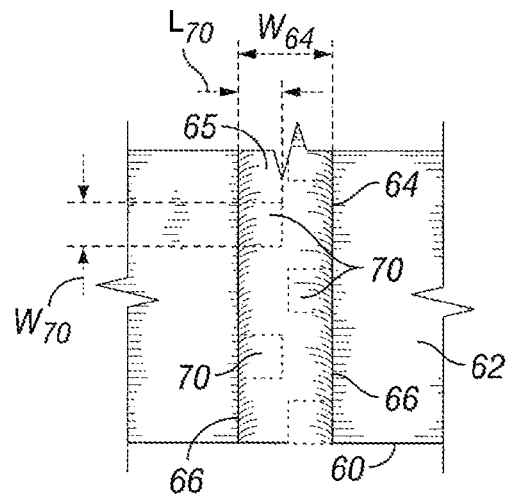

FIG. 10 is a top view of the groove-forming element shown in FIG. 9 arranged within a base portion of the mold.

Figure 11:
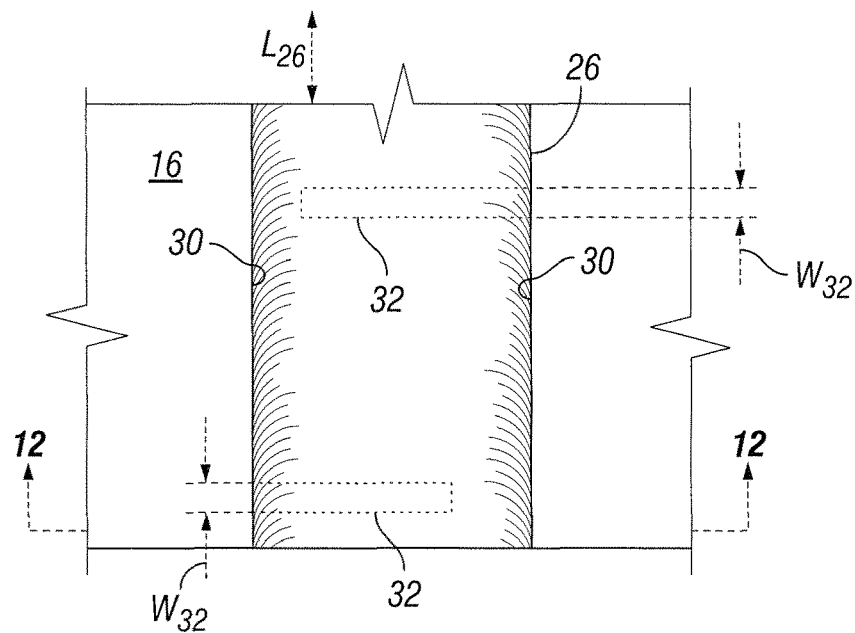

FIG. 11 is a top view of a tread having a submerged groove that includes a plurality of noise suppressors positioned in a spaced arrangement along a length of the submerged void and in staggered arrangement between opposing sides of the submerged void along a length of the submerged void in accordance with another embodiment of the invention.

Figure 12:
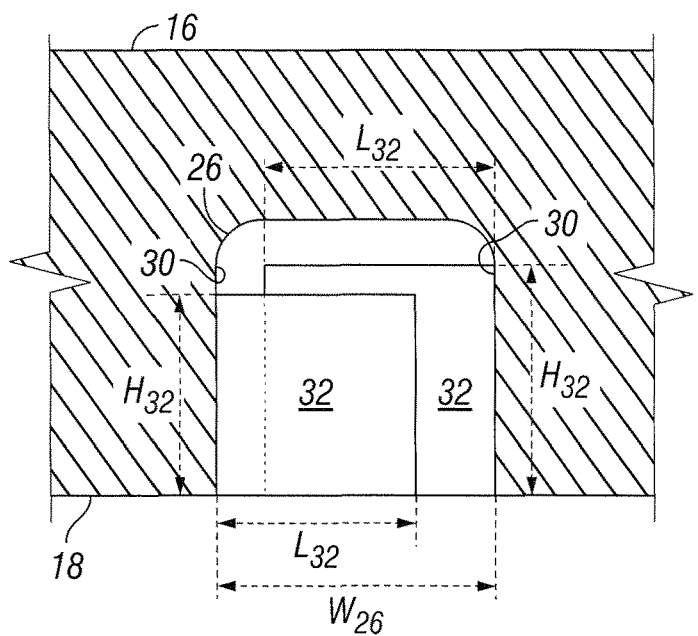

FIG. 12 is a sectional view taken along line 12-12 in FIG. 11 showing a pair of differently sized noise suppressors extending into the submerged void from opposing sides of the submerged void at different, spaced locations along a length of the submerged void.

DETAILED DESCRIPTION OF PARTICULAR EMBODIMENTS

Particular embodiments of the present invention provide tire treads for use in cold retreading manufacturing of retreaded tires. In cold retreading, a new tread is molded separately prior to installation on the tire carcass, such as in a flat mold or an annular mold, for example. The new tread may be fully or partially cured prior to its application upon a tire carcass to form a pre-cured tread. Subsequently, the pre-cured tread is arranged or placed atop a pre-existing or used tire carcass. The tire carcass may be prepared to receive the new tread by any known means, such as by buffing, grinding, abrading, or cutting the prior tread from the carcass. Prior to applying the tread to the tire carcass, a bonding material may be arranged between the new tread and the tire carcass to promote adhesion and bonding between the tread and the tire carcass. The bonding material may comprise any known material suitable for its intended purpose of bonding the new tread to the tire carcass. For example, the joining material may comprise an adhesive or material curable by way of vulcanization, such as natural or synthetic rubber or any other elastomeric and/or polymeric material, which is commonly referred to as liaison rubber or cushion gum. The retread tire is typically bonded together by vulcanizing or curing the tire assembly causing the joining material to bond the new tread to the tire carcass.

Such tire treads often include a tread pattern formed along a top or outer side or face of the tread for engagement with a ground surface during tire operation. The tread pattern includes grooves arranged along the top side, such as longitudinal and/or lateral grooves. Grooves arranged in fluid communication with the top side are referred to herein as primary or top grooves. Treads may further include submerged voids arranged along a bottom or inner side or face of the tread. Submerged voids may comprise, in particular embodiments, longitudinal or lateral grooves in fluid communication with the bottom side of the tread. Such grooves are referred to herein as secondary or bottom grooves. Longitudinal grooves, whether comprising top or bottom grooves, may form circumferential grooves when the tread is arranged on a tire carcass.

When employing submerged voids, such as lateral or longitudinal tread grooves, wear layers are provided within the tire tread such that the submerged voids become exposed to the top side of the tread as a sufficient thickness of the tread is worn. This way, the tread pattern, and the void exposed to the top side of the tread, may evolve and alter as desired during the life of the tire. This aids in controlling the location of tread void along the top side of the tread, as well as the arrangement of other tread features and control of the tread stiffness, as the tire wears. In particular instances, it may also be desirous to arrange one or more projecting features within each submerged void for use when the submerged void becomes exposed to the tread top side, where the one or more projecting features extend partially across a width of the submerged void and comprise wear indicators, stone ejectors, and/or noise suppressors. Accordingly, the projecting feature may project inwardly from a side of the submerged void in any predetermined manner or direction to achieve a particularly shaped wear indicator, a stone ejector, or a noise suppressor.

In particular embodiments, projecting features comprise a plurality of wear indicators arranged in a spaced arrangement along a length of the submerged void to provide a manner of determining the amount of useable tread remaining on the tire. Specifically, wear indicators extending partially across a width of the submerged void also extend a predetermined height above a bottom of the submerged void within the skid depth of the tread to indicate that only a certain useable thickness of the tread remains. In certain instances, at least a portion of the wear indicator length extends a constant height from a bottom of the tread or of the submerged void, or a constant height from a top of the submerged groove. For example, wear indicators are arranged to extend outwardly from the bottom of a groove by a predetermined height, such as 0.0625 inches or 1.6 millimeters (mm) to a top of the wear indicator arranged along a constant height portion of the wear indicator length.

In further embodiments, projecting features comprise a plurality of stone ejectors arranged in a spaced arrangement along a length of the submerged void to assist in discharging or otherwise discouraging the retention of any stones, pebbles, gravel, or other undesired objects within the submerged void once exposed to the top side. Stone ejectors extend partially across a width of the submerged void at any desired depth within the submerged void, whereby a bottom of the stone ejector may be co-planar or spaced above a bottom of the submerged void. Stone ejectors extend outwardly from a side of the submerged void in any direction and may form any desired shape. In specific instances, stone ejectors project upwardly in height within the submerged void depth toward a top of the submerged void as the stone ejector extends lengthwise into a width of the submerged void width from a side thereof. For example, the top side of the stone ejector may gradually taper upward within the void depth, such as to a central location within a width of the void, or a raised projection may extend upwardly from the top side of the stone ejector at any location along the length of the stone ejector.

In yet further embodiments, projecting features comprise noise suppressors extending partially across a submerged void width to parse or breakup the column of air arranged within the submerged void to reduce the amount of noise generated during tire operation once the submerged void becomes exposed to the tread top side. Noise suppressors form a projection extending partially across a width of the submerged void, and may comprise any shape including a shape similar to a wear indicator or stone ejector except that, in particular embodiments, the noise suppressor may be larger whereby the noise suppressor extends further across the height and/or the width of the submerged void to occupy more of the void cross-sectional area at any location along the void length. The void cross-sectional area is defined by the width and height of the submerged void, each extending perpendicularly across the void relative to a lengthwise direction of the submerged void. When the void is a groove, the void cross-section is often referred to as the void "see-through." For example, in certain embodiments, the noise suppressor extends across a width of each submerged void and a depth of each submerged void by a corresponding length and a height to occupy 40% or more, 50% or more, 60% or more, 67% or more, or 75% or more of the cross-sectional void area.

The following discussion concerns tire treads having submerged voids including projecting features comprising wear indicators, stone ejectors, and/or noise suppressors.

The projecting features, whether wear indicators, stone ejectors, or noise suppressors, extend or project partially across a width of the submerged void. The width of the submerged void is defined by opposing sides or side walls. In particular embodiments, the projecting features extend outwardly in a lengthwise direction from at least one of the submerged void sides and partially across the width of the submerged void. In extending partially across the void width, the projecting features extend lengthwise a distance less than the full void width. For example, in certain instances, projecting features have a discontinuity arranged along a length of the projecting feature when the projecting features generally extends lengthwise across a width of the submerged void. In such instances, the projecting feature can be described as having a pair of opposing projecting members extending from opposing sides of the submerged void and being separated by the discontinuity. In other examples, the projecting feature comprises a single projecting member extending partially from one side of the submerged void.

In instances when the projecting feature comprises a pair of opposing projecting members separated by a discontinuity, the opposing projecting members the pair of projecting members can be described as forming a first portion extending from one side of the void and a second portion extending from the other side of the void. Opposing projecting members may be arranged directly opposite each other, or may be shifted in a lengthwise direction along the submerged void while remaining at least partially opposite each other. When a plurality of projecting features are arranged on opposing sides of a submerged void along a length of the submerged void, where the projecting features comprise a single projecting member extending partially across a width of the projecting member, the projecting features may be arranged on the opposing sides of the void to be directly opposite each other, partially opposite each other where the projecting features are arranged at similar but different locations along the length of the submerged void, or may be staggered or spaced in a lengthwise direction of the submerged void such that the projecting features are arranged are not arranged opposite or partially opposite each other.

In instances where a discontinuity is present, the discontinuity may form a slit, cut, crack, tear, or fracture extending through a cross-section (i.e., width and depth or thickness) of projecting feature at a location along a length of the projecting feature. For example, a crack or fracture may arise when a molding element is pulled through the projecting feature during tread de-molding operations, where the tread is removed from a corresponding mold. The crack, tear, or fracture may occur at any location along the length of the projecting feature. It is understood that such discontinuities may arise along a length of the projecting feature having constant cross-section, or, in other embodiments, at a location of reduced cross-section arranged along the length of the projecting feature to provide a location for the crack, tear, or fracture to initiate or occur. This area of reduced cross-section may comprise a notch or groove formed in the cross-section, or may comprise a more gradual tapering of the projecting feature resulting in a more gradual narrowing of the cross-section. The crack, tear, or fracture may not result in a noticeable separation between the opposing first and second portions, meaning a discontinuity may result without forming a gap between terminal ends of the first and second portions. In other variations, the discontinuity may form a gap between terminal ends of the first and second portions of the having a readily discernable width. In any event, the discontinuity may be molded into the tread, or may be formed after molding during a post-molding operation, such as during de-molding of the tread or pursuant another operation whereby the discontinuity is formed by fracturing, slicing, cutting, or any other process to form a discontinuity in the projecting feature.

Elevationally within the submerged void, the projecting feature may be arranged in any location between a top and a bottom of the submerged void. In other words, the projecting feature is arranged in any depthwise location within a thickness of the tread at or below top of the submerged void and at or above the bottom of the submerged void within a height of the submerged void. Therefore, a height of the projecting feature, extending depthwise within the tread between a top and bottom of the projecting feature, is arranged between the top and bottom of the submerged void. In particular instances, a top of the projecting feature is spaced below the top of the submerged void. Furthermore, a bottom of the projecting feature may be arranged along the bottom side of the tread, or may be recessed a distance depthwise into the tread thickness above the bottom side of the tread. It is understood that the depthwise direction connotes a radial direction when the tread is arranged annularly, such as when forming a tread ring or when arranged annularly around a tire carcass.

Because the projecting feature does not extend continuously across a full width of the submerged void, there may be a need to increase the stiffness of the projecting feature. For example, additional stiffness may be desired to resist forces that may otherwise deflect the projecting feature outward, away from the tire carcass and further into the submerged void when the submerged void is being applied to a tire carcass.

Exemplary embodiments of the projecting features described above, arranged within a submerged void, are discussed below in association with particular figures provided herewith.

Figure 1:
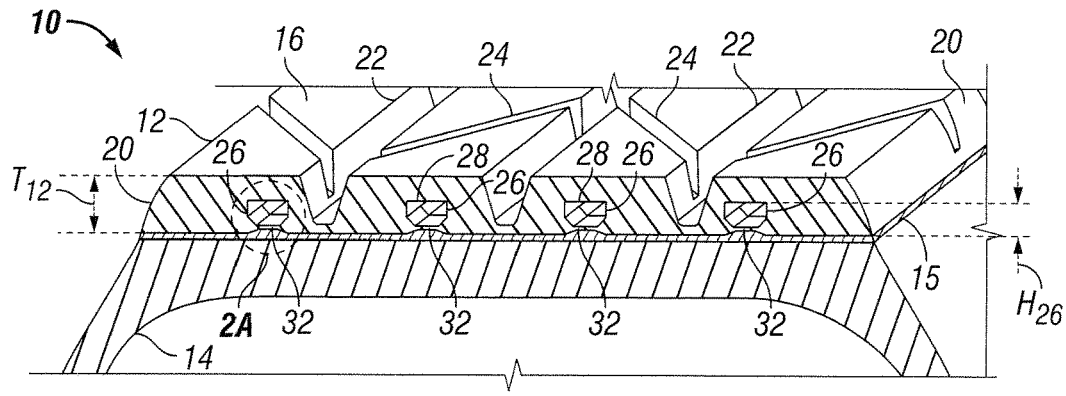

With reference to FIG. 1, an exemplary retreaded tire is shown. Retreaded tire 10 includes an exemplary tread 12 arranged atop a tire carcass 14 and bonded thereto with bonding material 15 arranged there between. The tread 12 includes a top side or face 16 (i.e., an outer side) and a bottom side or face 18 (i.e., an inner side), and a tread thickness bounded depthwise by the top side and the bottom side. The top side 16 is configured to engage a ground surface during tire operation, while the bottom side 18 is configured for attachment to the tire carcass 14. The tread thickness also extends laterally between opposing side edges 20. Typically, the width of the tread thickness along the top side 16 is less than or the same as the width of the tread thickness along the bottom side 18.

The tread further includes a tread pattern arranged along the top side 16. The tread pattern includes one or more top longitudinal grooves 22 and/or one or more top lateral grooves 24 in fluid communication with the top of the tread. The top longitudinal grooves 22 form circumferential grooves at least when installed along a tire carcass, such as is shown in FIG. 1. Prior to arrangement on the tire carcass 14, the longitudinal grooves 22 may extend longitudinally in a lengthwise direction of the tread without extending circumferentially, such as when formed in a flat mold, for example. Lateral top grooves 24 may be provided on the top side of the tread extending in a widthwise or lateral direction of the tread transverse to the longitudinal or circumferential direction of the tread 12 or longitudinal grooves 22. The arrangement of top longitudinal grooves 22 and lateral grooves 24 may form tread blocks or elements arranged along the outer or top side 16.

With continued reference to FIG. 1, tire tread 12 further includes submerged voids 26 comprising submerged longitudinal grooves in fluid communication with the bottom of the tread, each submerged groove extending into the tread thickness $T_{12}$ from the tread bottom side a distance $H_{26}$ to a top terminal location 28 recessed below the top side 16. Distance $H_{26}$ is also referred to as the height of the submerged void 26. The submerged grooves 26, which are also referred to as bottom grooves, provide one or more submerged wear layers when a submerged groove becomes exposed to the top side 16 as the tread wears to a particular depth within the tread thickness $T_{12}$. While a new, unworn tread is shown in FIG. 1, once the tread wears from top side 16 to the top 28 of any submerged void 26, the submerged void becomes exposed to the top side along with any projecting features arranged within the void. Upon exposure, the previously submerged void 26 and any projecting feature 32 arranged therein are then in fluid communication with the top side 16. When tread 12 is attached to the tire carcass 14 to form a retreaded tire, the bottom side 18 is attached to the tire carcass 14, thereby closing bottom grooves 26 along the bottom side 18 of the tread. It is understood that top grooves and bottom grooves may be relationally positioned in any desired arrangement. It is also understood that top and bottom grooves may have a constant depth or a variable depth extending into the thickness of the tread, and each may extend lengthwise along any desired linear or non-linear path.

With continued reference to FIG. 1, projecting features 32 are shown arranged within each submerged void 26. In particular, in the embodiment shown, projecting features 32 form wear indicators arranged within each submerged void 26 comprising a longitudinal groove. Details of the projecting features 32 are more clearly shown in FIGS. 2A-2B. In the embodiment shown, each wear indicator 32 extends outwardly from a side (also referred to as "sidewall") 30 of the submerged void 26 and partially across a width $W_{26}$ of the submerged void. More specifically, the wear indicators 32 shown each include a discontinuity 36 arranged along its length $L_{32}$ and separating or parsing the projecting feature 32 into a pair of opposing first and second projecting members 34a, 34b. Each of the first and second projection members 34a, 34b may extend outwardly from void side 30 in any desired manner. For example, each of the first and second projecting members 34a, 34b shown decrease in cross-section as each extends lengthwise into the void 26 from each void side 30 until the top 38 of each such projecting member reaches a desired height $H_{38}$ above the bottom side 18. In the embodiment shown, height $H_{38}$ is achieved in a region 43 of constant height. Region 43 is also arranged centrally within the void width $W_{26}$ or along the length $L_{32}$ of the projecting feature. It can also be said that region 43 is arranged adjacent a terminal end of any projecting member 34a, 34b. Moreover, in the embodiment shown, region 43 is characterized as generally having a constant cross-section, except for an area of reduced cross-section 44 arranged along its length, which may not be present in other embodiments. Region 43 may occur centrally along the length of projecting feature 32 or at any other location along length $L_{32}$. In other embodiments, projecting feature 32 as well as each of the projecting members 34a, 34b may be characterized as having a constant cross-section along the full of length $L_{32}$ of the projecting feature.

Figure 2A:
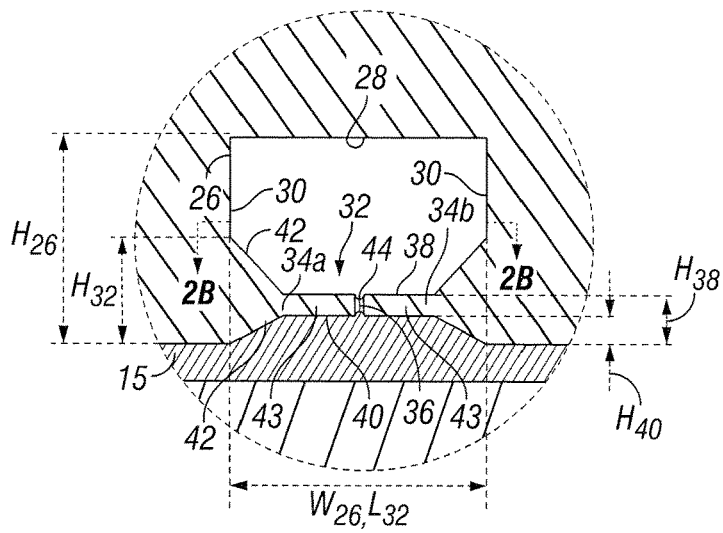
FIG. 2A is a front sectional view of a portion of the tread shown in Section 2A in FIG. 1, the section showing a wear indicator within a submerged longitudinal groove and having a discontinuity comprising a fracture formed at a location of reduced cross-section along the wear indicator's length according to a particular embodiment of the invention.

With continued reference to FIG. 2A, it can be said that this decrease in cross-section is achieved by adding strengthening structure (or "strengthening members") 42 along the top 38 of any projecting member 34a, 34b where each projecting member intersects a side 30 of void 26. The strengthening structure 42, which may comprise a narrowing cross-section, such as a fillet or chamfer, for example, may be formed monolithically as part of each projecting member, such as through the molding process using the same tread material, or separately during or after the molding process using any suitable material. In the embodiment shown, strengthening structures 42 are arranged between a submerged void side 30 and a region 43 of constant height and/or of constant cross-section, although in other embodiments strengthening structures may continue along the length $L_{32}$ of projecting feature 32 until reaching a terminal end thereof or of any projecting member 34a, 34b. Strengthening structure 42 aids in strengthening any projecting member 34a, 34b cantilevered from a void side 30 by increasing the projecting member's bending modulus to resist any bending or deformation of the projecting feature as the tread is being arranged atop the tire carcass. Resisting bending or deformation promotes proper bonding and arrangement of each projecting member along the tire carcass. Strengthening structures 42 may also provide an area of reduced cross-section for forming a discontinuity at a location along length $L_{32}$. With continued reference to FIG. 2A, bottom 40 of projecting feature 32 also varies in height by a distance $H_{40}$ to region 43. While this may further assist in strengthening each projecting feature 34a, 34b, it is understood that projection feature bottom 40 may remain flush or co-planar with the tread bottom side 18, which is exemplified in FIGS. 3A and 3B, each figure also showing alternative wear indicators to the wear indicator of FIG. 2A.

In summary, the increase or decrease in cross-section may be achieved by altering the width and/or height of each projecting member. For example, with reference to FIGS. 2A and 2B, the height $H_{32}$ and width $W_{32}$ of projecting feature 32 varies from a larger cross-section adjacent each void side 30 to a smaller cross-section within a central region of the void width $W_{26}$ or of the projecting feature length $L_{32}$. In any event, it is clear with reference to FIGS. 2A-2B that strengthening structure 42 may be arranged at any location or fully around the perimeter of any projecting member adjacent a void side 30 to provide additional strength. Furthermore, the reduction in cross-section may extend continuously, discontinuously, or intermittently along a length of the projection feature 32 or any projecting member 34a, 34b from a void side 30 and until reaching the discontinuity 36 or the area of reduced cross-section 44, which may also comprise region 43. Therefore, it is understood that strengthening structures 42 may continue to cause a reduction in cross-section until reaching, or to form or define, an area of reduced cross-section 44.

It is understood that formation of discontinuity 36 may be achieved according to any known manner. With reference to the particular embodiments shown in FIGS. 1-2B, for example, projecting feature 32 is molded to extend continuously between the sides 30 of the submerged void 26. Subsequently, with reference to FIG. 6, as the tread is de-molded from the mold, however, a submerged groove-forming element (discussed further below, and shown in FIGS. 4-6) is pulled through the projecting feature 32 to impart tension T upon the projecting feature and thereby form a fracture 36 through an area of reduced cross-section 44 arranged along a length of the projecting feature. The fracture 36 forms a discontinuity along the length $L_{32}$ of the projecting feature, and thereby dividing the projecting feature into a pair of opposing projecting members 34a, 34b. To facilitate this in particular embodiments, as each projecting feature 32 extends from a side 30 of the void, the projecting feature narrows in cross-section to a location of reduced cross-section. A reduction in cross-section controls the fracturing of the projecting feature by directing fracture initiation to the location of reduced cross-section. Nevertheless, a discontinuity may be formed in other embodiments without the presence of any area of reduced cross-section, whereby a tear or fracture will arise at an arbitrary location.

Figure 2B:
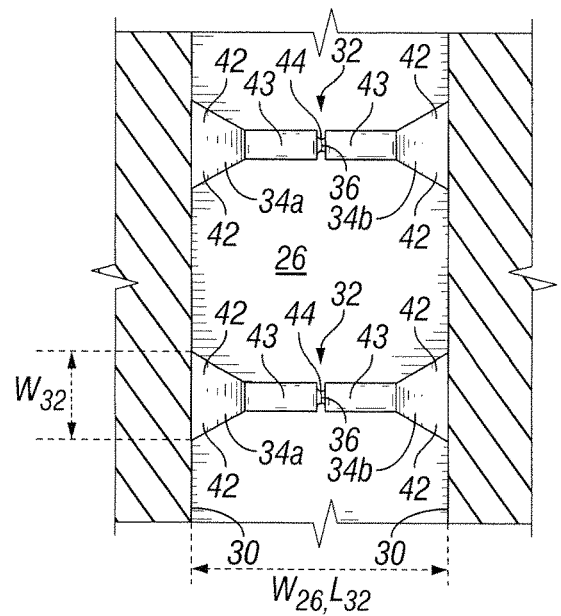
FIG. 2B is a top view taken along line 2B-2B in FIG. 2 showing a top view of the wear indicator arranged within the submerged longitudinal groove according to a particular embodiment of the invention.

In the embodiment shown in FIGS. 2A-2B, an area of reduced cross-section comprises a recess (or "notch" or "groove") 44 extending fully (or partially in other embodiments) about a perimeter of the projecting feature cross-section at any desired location along the length $L_{32}$ of the projecting feature 32. This recess 44 generally has a semi-circular cross-section (or "profile"), but may comprise any other desired shape in other variations. For example, recess 44 may have a triangular, square, or rectangular profile. In embodiments where a recess 44 is not present, region 43 may operate as an area of reduced cross-section when areas of larger cross-section are adjacent region 43, such as is shown by example in the figures. The area of reduced cross-section may also be achieved by tapering the cross-section of the projection feature from a larger cross-section to an area of reduced cross-section, which may be achieved in a more gradual manner than is shown in the figures. This tapering or reduction in cross-section may be achieved by strengthening members 42. In other words, a more gradual reduction in cross-section may be achieved by sufficiently expanding or widening recess 44 along a length of the projecting feature. It is understood that the location of reduced cross-section may be arranged any location along the submerged void width $W_{26}$ or the projecting feature length $L_{32}$. Therefore, discontinuity 36 may be arranged at any location along width $W_{26}$ of the submerged void or length $L_{32}$ of projecting feature 32, from a location adjacent a side 30 to the midpoint of the void width $W_{26}$ as shown in FIG. 2A.

Figure 3A:
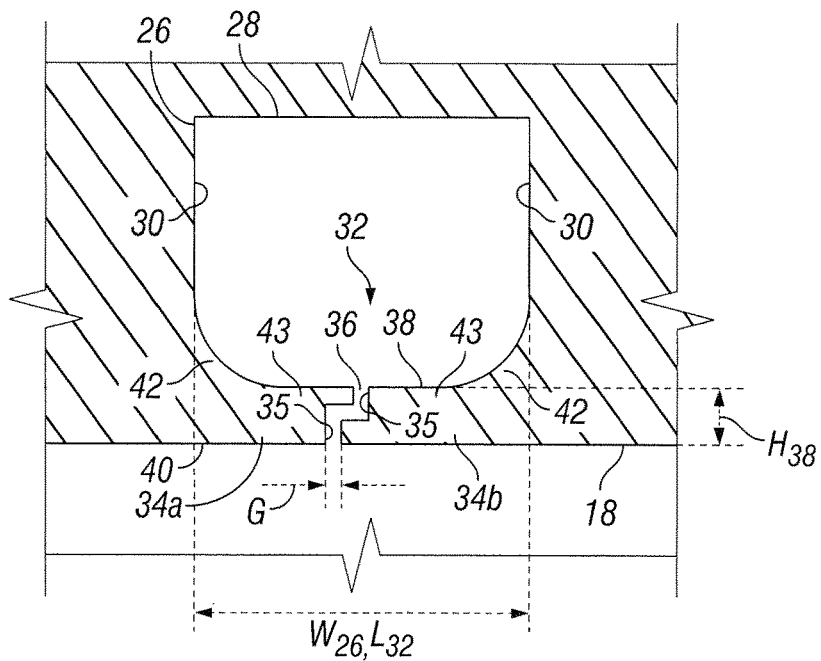
FIG. 3A is a front sectional view of an alternative embodiment of the wear indicator shown in FIG. 2A, the alternative wear indicator having a gap arranged along a length of the wear indicator between the terminal ends of opposing projecting members collectively forming the wear indicator.
Figure 3B:
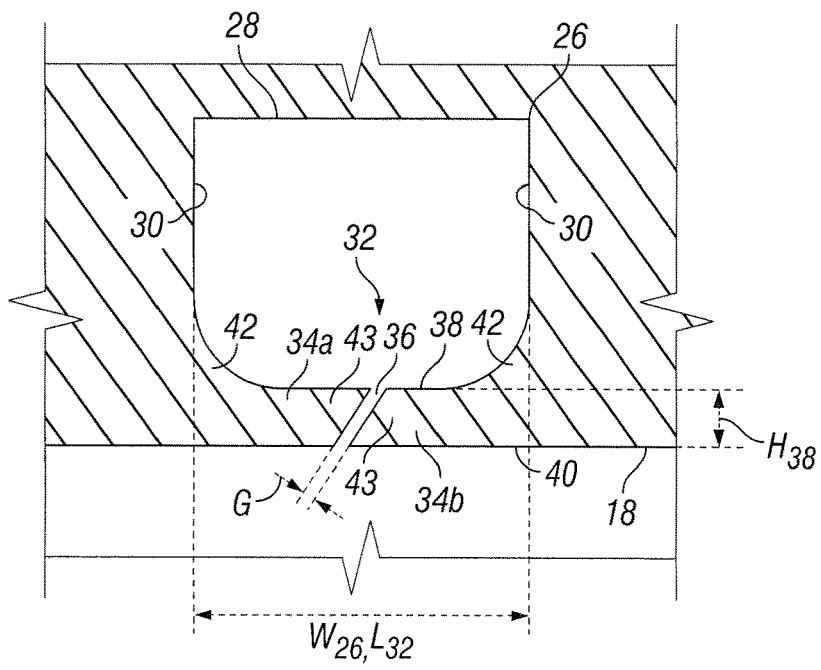
FIG. 3B is a front sectional view of a further embodiment of the wear indicator shown in FIG. 3A now showing the terminal ends of the opposing projecting members are planar and biased at an angle greater than or less than 90 degrees relative the tread bottom side.

With reference to FIG. 3A, the discontinuity 36 may comprise a gap G molded across the width and height of the projecting feature 32 at any location along the length $L_{32}$ of the projecting feature. In the embodiment shown, gap G is arranged between the terminal ends 35 of first and second projecting member 34a, 34b. It is understood, however, that gap G may be arranged between a side 30 and a projecting feature 32 when projecting feature 32 only comprises one of the first and second projecting members 34a, 34b extending substantially the full width $W_{26}$ of the submerged void 26 whereby the discontinuity is arranged between a void side wall 30 and the free terminal end 35 of the projecting feature 32. While gap G may extend along any desired path through the cross-section, FIG. 3A shows a gap G extending along a non-linear path such that a step is formed, and the terminal ends 35 of each adjacent projecting member 34a, 34b are stepped or non-planar. This may assist in strengthening at least one of the first and second projecting members 34a, 34b when the terminal ends 35 contact each other when one of the projecting members 34a, 34b deflects upwardly relative the other. In the embodiment shown in FIG. 3A, at least the second projecting feature 34b is strengthened when deformed. Gap G may be constant or variable. For example, gap G may extend linearly between terminal ends having planar surfaces cooperatively arranged in a parallel arrangement such as shown in FIG. 3B, or non-linearly such as shown by example in FIG. 3A through the cross-section of any projecting feature 32. It follows that terminal ends 35 may have a planar or non-planar surface or face extending along the cross-section. Moreover, the surface or face of the terminal ends may be oriented or biased in at any angle relative a vertical or horizontal plane extending through a centerline of the projecting feature's length or width, respectively. In FIG. 3B, gap G and the surface face of terminal ends 35 are biased at an angle less than or greater than 90 degrees relative the bottom side 18.

In any embodiment shown or contemplated, each wear indicator 32 may comprise any height. In particular embodiments, wear indicator height $H_{32}$ is approximately equal to 1.6 mm, while in other embodiments wear indicator height $H_{32}$ is 2 mm or less or 1 mm or less. Furthermore, the height $H_{38}$ of top side 38 may be generally 1.6 mm in certain embodiments, although any other height may employed. Furthermore, the width $W_{32}$ of each projecting feature 32 is equal to 10 mm or less, 3 mm or less, or 1.5 mm. Furthermore, it is understood that a plurality of wear indicators may be arranged along a length of the submerged void, whereby each of the wear indicators are spaced apart by a predetermined distance along a length of the submerged void, such as is shown exemplarily in FIG. 8 in association with stone ejectors 32.

In other particular embodiments, projecting feature 32 comprises a stone ejector. With reference to FIGS. 7A-7B, a plurality of projecting features 32 comprising stone ejectors are shown. Each projecting feature 32 comprises either a first or second projecting member 34a, 34b extending outwardly from a void side 30 lengthwise to a terminal end 35 arranged partially across a width $W_{26}$ of void 26. The shape and arrangement of the stone ejectors 32 may comprise the shape and arrangement of any known stone ejectors located in a top groove 22. In the embodiment shown, ejectors 32 are formed by providing a staggered arrangement of first and second opposing projecting members 34a, 34b such that first projecting features are arranged between second projecting features along opposing void sides 30. The stone ejectors may be elevated or spaced above the bottom surface by any desired distance, or arranged along the tread bottom side. For example, in FIG. 7A, stone ejectors 32 in the middle submerged void are arranged flush or coplanar with the tread bottom while the stone ejectors in the other submerged voids are elevated above the tread bottom. Stone ejectors may be sized and shaped as desired. In particular embodiments, for example, stone ejectors have a height $H_{32}$ equal to or less than 4 mm and equal to or greater than 2 mm and a width $W_{32}$ equal to or less than 10 mm and equal to or greater than 5 mm.

As mentioned previously, stone ejectors may project upwardly in height within the submerged void depth toward a top of the submerged void as the stone ejector extends lengthwise into a width of the submerged void width from a side thereof. With reference to FIGS. 8A-8B, stone ejectors 32 are shown having a top side 38 including a raised projection 46 extending upwardly from the top side ejector at a location spaced from a side 30 of the submerged void. It can be said that the raised projection is also arranged at a central widthwise location of the submerged void, and adjacent a terminal end 35 of the ejector. The raised projection may extend any desired distance or height above the top side. The raised projection may also project in any desired manner to form any desired shape. For example, the raised projection shown has a flat top side. However, it is understood that the top side of the raised projection may be contoured or pointed, or may contain a ridge or the like.

In yet further embodiments, noise suppressors are arranged within the submerged voids to control the noise created as the tire rotates during operation. The noise suppressors may be shaped and sized just as the wear indicators and/or stone ejectors described above and as shown in FIGS. 1-3 and 7A-10, although the noise suppressors may be larger in size in particular embodiments. For example, with reference to FIGS. 11 and 12, exemplary noise suppressors 32 are shown having a length $L_{32}$ extending partially across a width $W_{26}$ of a submerged void 26 and a width $W_{32}$ extending along a length $L_{26}$ of the submerged void. A cross-section of the submerged void 26 is shown by example in FIG. 12, whereby each noise suppressor 26 extends 50% or more along of through the cross-sectional void defined by the height $H_{32}$ and width $W_{26}$ of the submerged void. Just as stone ejectors may be arranged in a spaced relationship and staggered from side-to-side along a length of the submerged void, with reference to FIG. 11, a plurality of the noise suppressors 32 may be strategically located along the length $L_{26}$ of any lateral or longitudinal groove in a spaced arrangement and/or staggered in an alternating arrangement between opposing sides 30 to control noise. Any specific sizing and arrangement of the noise suppressors may be provided as desired according to any known method.

Particular embodiments of the present invention includes methods for forming any tire tread discussed or contemplated herein having projecting features comprising wear indicators, stone ejectors, and/or noise suppressors arranged within a submerged void extending into the tread thickness from the bottom side of the tread, whereby each of the projecting features extend partially across a width of the submerged void. In particular embodiments, a method of forming a tire tread comprises providing a mold for forming the tire tread. Any mold or molding process may be employed having been modified to include cavities and other elements for forming the projecting features and arrangements thereof within a tire tread as discussed and otherwise contemplated herein.

In more specific embodiments, the mold comprises at least a first mold portion and a second mold portion operatively positionable together to form a tread-forming cavity there between corresponding to a tire tread, the first mold portion including a top interior side corresponding to a top side of a tread thickness configured to engage a ground surface during tire operation. Furthermore, the second mold portion includes a bottom interior side corresponding to a bottom side of the tread thickness configured to attach to a tire carcass and a submerged void-forming element projecting outwardly from the bottom interior side and into the tread-forming cavity to a terminal end recessed below the top interior surface to form a corresponding submerged void within the tread thickness. The submerged void-forming element also includes a plurality of projecting feature-forming cavities for forming a plurality of corresponding projecting features extending at least partially within a width of a groove formed within the tread thickness.

A further step of such methods includes molding tread material arranged within the tread-forming cavity of the mold to form a molded tread. In particular embodiments, such step forms a tread having a tread thickness bounded depthwise by a top side configured to engage a ground surface during tire operation and a bottom side configured to attach to a tire carcass, the thickness extending laterally between a first side edge and a second side edge and longitudinally in a lengthwise direction of the tread.

Such tread may further include a submerged void extending into the tread thickness from the bottom side of the tread to a terminal location recessed below the top side. For example, the submerged void may comprise a bottom groove. It is understood that the bottom groove may comprise any groove extending lengthwise in any direction or along any linear or non-linear path along the tread bottom side. For example, the bottom groove may comprise a longitudinal groove, that is, a groove extending lengthwise in a generally longitudinal direction of the tire. By further example, the bottom groove may comprise a lateral groove, that is, a groove extending lengthwise in a generally lateral direction of the tire.

Such tread may further include a plurality of projecting features arranged within the submerged void below the terminal location of the submerged void. The plurality of projecting features are further arranged in a spaced arrangement along a length of the submerged void, each of the plurality of projecting features extending partially across a width of the submerged void and comprise either a wear indicator, a stone ejector, or a noise suppressor. It is understood that a wear indicator or a stone ejector may also operate as a noise suppressor.

In particular embodiments of the methods, each of the plurality of projecting feature-forming cavities in the mold extend through a width of the submerged void-forming element. Extending through a width of the submerged void-forming element comprises extending from a first side of the submerged void-forming element to an opposing second side of the void-forming element, whereby the first and second sides define the width of the void-forming element. Accordingly, extending through a width may include extending across the full width of the void-forming element. In such embodiments, each of the plurality of projecting feature-forming cavities extend through a width of the submerged void-forming element such that each of the projecting features formed within the molded tread in the step of molding form a continuous projecting feature extending fully across the width of the submerged void.

In embodiments of the invention where each of the plurality of projecting feature-forming cavities in the mold extend through a width of the submerged void-forming element to form a mold tire tread having a continuous projecting feature extending across a width of the submerged void, such methods may further comprise the step of removing the molded tread from the mold whereby the submerged void-forming element is pulled through each of the plurality of projecting features to form a discontinuity comprising a fracture extending across a cross-section of each projecting feature at a location along a length of the projecting feature. The fracture may comprise a rip or tear across the cross-section as the tread is deformed and stretched to create tension along the continuous projecting feature. Each such discontinuity may be formed at a location of reduced cross-section along the length of the projecting feature. Such location of reduced cross-section may result from a gradual tapering of the projecting feature cross-section as the projecting member extends lengthwise, or may comprise a recess or groove extending around at least a portion of the perimeter of the cross-section.

In particular embodiments of such methods, each of the plurality of projecting feature-forming cavities extend partially through a full width of the submerged void-forming element from a first side of the submerged void-forming element. In further embodiments of such methods, a second plurality of projecting feature-forming cavities each extend partially through a full width of the submerged void-forming elements from a second side of the submerged void-forming element, the first side arranged opposite the second side to define the width of the submerged void-forming element. The plurality of projecting feature-forming cavities arranged on the first side of the submerged void-forming element may be positioned in any arrangement relative the plurality of projecting feature-forming cavities arranged on the second side of the submerged void-forming element. For example, in such methods the plurality of projecting feature-forming cavities arranged on the first side of the submerged void-forming elements are arranged opposite the plurality of projecting feature-forming cavities arranged on the second side along a length of the feature-forming cavities. By further example, in such methods the plurality of projecting feature-forming cavities arranged on the first side of the submerged void-forming elements are arranged between the plurality of projecting feature-forming cavities arranged on the second side along a length of the feature-forming cavities.

In particular embodiments of such methods, each of the plurality of projecting feature-forming cavities narrow in cross-section as each of the plurality of projecting feature-forming cavities extend lengthwise into the groove-forming element from a side of the groove-forming element. Projecting feature-forming cavities may be shaped in any manner as necessary to form any projecting feature contemplated herein. For example, tapering projecting features may be achieved by arranging tapering voids along any portion of the perimeter of a projecting feature-forming cavity adjacent a side of the submerged void-forming element from which the projecting feature-forming cavity extends. These tapering voids form strengthening structures along the corresponding projecting feature as discussed herein.

Such methods may further include the step of providing a tire carcass, which may be new or used. Prior to applying a new tread layer to a used tire carcass, the used tire carcass may be prepared, such as by cleaning an outer circumference of the tire carcass and/or at least partially or fully removing a portion of a pre-existing tread layer arranged about an outer circumference of the tire carcass by any known means of removing tread material. Such means may comprise any abrading, buffing, or grinding operation. Particular embodiments of such methods may further include the step of applying a bonding layer atop the tire carcass or the pre-existing tread layer prior to applying the new tread layer. The bonding layer is formed of any elastomeric or polymeric material that is curable.

Such methods may further include the steps of arranging the tire tread overtop and around the tire carcass, and bonding the tire tread to the tire carcass. In particular embodiments, the step of bonding includes bonding each of the projecting features or the projecting members to the tire carcass. This step may be accomplished by any known means for curing the tread to the tire carcass. For example, the assembled retread tire (i.e., a tire carcass having a tread applied thereto) may be at least partially arranged within a curing membrane and inserted into an autoclave to apply heat and pressure to the assembled retreaded tire. It is understood that any method known to one of ordinary skill for forming a tire having a molded tread may be employed, as elements for forming the inventive projecting features arranged within a submerged void as discussed herein may be added and adapted to any known molding process.

Exemplary tread molds for forming a tire tread discussed above will now be discussed in further detail. It is understood that the mold may comprise any mold capable of and suitable for forming the treads contemplated above. For example, the mold may comprise a flat mold configured to mold a length of tread having opposing terminal ends or an annular mold configured to mold a continuous annular ring. The tire tread formed by a flat mold is formed to have a length extending between two opposing terminal ends, whereby the tread is subsequently wrapped around a tire carcass to form an annular tread. Annular molds, in the alternative, mold the tire tread into a continuous annular form. It is understood that the features described herein for forming the projecting features 32 within a tread may be employed by any known tire tread mold, such as flat or annular molds.

Referring now to FIG. 4, a mold 50 is shown for use in forming the tire tread of FIGS. 1-2B. In particular, mold 50 includes at least a first or top mold portion 52 and a second or bottom mold portion 60, the first and second mold portions being operatively positionable together to form a tread-forming cavity 56 there between corresponding to a tire tread. While first and second mold portions 52, 60 are shown to cooperatively form cavity 56, it is understood that two or more mold portions may be operatively positionable to cooperatively form the tread-forming cavity. For example, the first and/or the second mold portions may be parsed into multiple mold portions positionable to cooperatively form the tread-forming cavity. In any event, cavity 56 corresponds to the tire tread in that the cavity and features thereof are configured such that during a molding process, the cavity forms tread material arranged therein into a tire tread having a desired shape and size.

The first mold portion 52 in FIG. 4 includes a top interior side 54 corresponding to form the top side 16 of a tread thickness. The top interior side 54 includes top groove elements 58 protruding outwardly toward the cavity 56 for forming corresponding top grooves 22 within a tread 12 shown in FIG. 1. First mold portion 52 also includes interior sides 57 for forming a corresponding side 20 of the tread shown in FIG. 1, although it is understood the interior sides may be partially or fully arranged within second mold portion 60 or another mold portion.

The second mold portion 60 in FIG. 4 includes a bottom interior side 62 corresponding to a bottom side 18 of the tread thickness. Extending outwardly from the interior bottom side 62 and into cavity 56 to a top terminal end 65 are submerged void elements 64 for forming corresponding submerged voids 26 within a tire tread 12, and in particular, for forming the submerged grooves shown in FIG. 1. Top terminal end 65 is recessed or spaced below top interior side 54 of first mold member 52. The submerged void-forming element 64 includes a plurality of projecting feature-forming cavities 70 for forming a plurality of corresponding projecting features 32 extending at least partially within a width of a submerged void formed within the tread thickness. The plurality of projecting feature-forming cavities 70 have a length $L_{70}$ extending at least partially into a width $W_{64}$ of the submerged void-forming element 64 from at least one side 66 of the element 64. Cavities 70 also have a width $W_{70}$ extending in a lengthwise direction of the submerged void-forming element 64. It is understood that cavities 70 may be shaped, sized, and arranged to form a corresponding projecting feature 32.

Figure 5A:
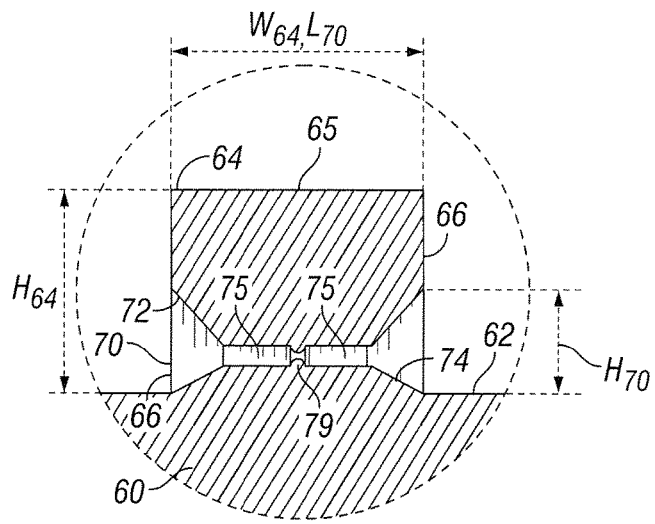
FIG. 5A is a front sectional view of a submerged void-forming element shown in Section 5A in FIG. 4, the submerged void-forming element having a cavity for forming a wear indicator across a width of a submerged groove as shown in FIG. 1, in accordance with an embodiment of the invention.

When it is desirous to form a projecting feature by fracturing a continuous projecting feature at a location of reduced cross-section by pulling the submerged void element through the continuous projecting feature during tread de-molding operations, projecting feature-forming cavity comprises a single cavity extending continuously across a width of element. FIGS. 4 and 5A show an exemplary projecting feature-forming cavity 70 extending continuously through or fully across width $W_{64}$, the width extending between opposing sides 66 of element 64. In particular, cavity 70 is configured to form the projecting feature 32 in FIGS. 1-2B. Accordingly, cavity 70 is shown to include a projection 79 extending around a periphery of cavity 70 to form a corresponding recess 44 within a molded projecting feature. It is understood that projection 79 may not be present, such as when projecting feature 32, or a length thereof, is of constant cross-section or when strengthening structures 42 form a location of reduced cross-section, such as region 43, as discussed previously.

Figure 5B:
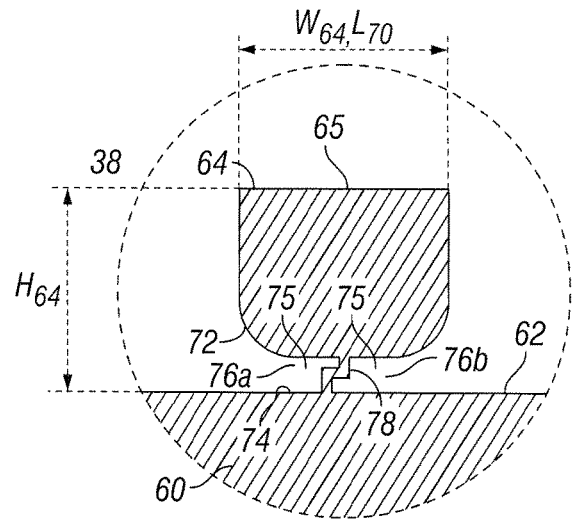
FIG. 5B is a front sectional view of an alternative embodiment of the submerged void-forming element shown in FIG. 5A, the alternative submerged void-forming element including a pair of opposing, spaced apart cavities for forming a wear indicator across a width of a submerged tread groove, the spacing forming a gap arranged along a length of the corresponding wear indicator.

Recess 44 forms a location of reduced cross-section for forming a fracture through the reduced cross-section. For example, with reference to FIG. 6, a fracture 36 is shown being initiated under tension T to ultimately form a fracture comprising a discontinuity extending fully through the reduced cross-section, such as is shown in FIG. 2 by example, when the submerged void-forming element 64 is pulled by de-molding force F fully through the projecting feature 32. A location of reduced cross-section may also be achieved by tapering the cross-section of projecting feature-forming cavity as it extends into the submerged void-forming element from a side thereof, which may occur more gradually than that provided by recess 44. For example, in FIG. 5A the height of cavity 70 narrows as cavity 70 extends lengthwise from each opposing side 66. This is achieved by varying the location of top interior side 72 and of bottom interior side 74 of cavity 70 as cavity 70 extends lengthwise. In FIG. 5B, only top side 72 varies as cavity 70 extends lengthwise. In each of the figures, each region 75 of each corresponding cavity corresponds to region 43 in FIGS. 2A and 2B. As discussed previously, however, the discontinuity formed in FIG. 6 may occur along a length of projecting feature 32 having a constant cross-section.

FIG. 5B exemplifies another manner of forming a discontinuity along a length of a projecting feature. As shown, a partition element 78 extends across projecting feature-forming cavity 70 at a central location along a width $W_{64}$ of submerged void-forming element 64 to parse cavity 70 into first and second projecting member-forming cavities 76a, 76b. In particular, partition element 78 extends in a direction biased relative to bottom interior side 62. Partition element 78 forms gap G as shown in FIG. 3A, but may be configured to form any gap contemplated herein.

It is understood that submerged void-forming element 64 may be formed as part of second mold portion 60, such as by casting or molding operations or by machining operations, or separately for operable attachment to the second mold portion, such as by welding or by use of fasteners. Furthermore, any projecting feature-forming cavity 70, as well as any first and second projecting member-forming cavities 76a, 76b may be formed into a submerged void-forming element 64 by any known means. For example, cavities 70, 76a, 76b may be molded, cast, or machined into element 64 using any known technique or process. Moreover, cavities 70, 76a, 76b may be formed by arranging one or more components with submerged void-forming element 64 to create corresponding cavities there between.

The present invention may be utilized in association with retreaded heavy duty truck or trailer tires. Heavy duty truck tires include steer and drive tires. Nevertheless, the present invention may be utilized in association with any type of tire to form any new or retreaded tire and as such, any type of tire may provide an embodiment of the present invention. Exemplary tire types for use with the subject invention further include light truck tires, off the road tires, bus tires, aircraft tires, bicycle tires, motorcycle tires, and passenger vehicle tires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated. Therefore, any features discussed in association with a wear indicator, stone ejector, or noise suppressor may be employed by any of the other unless otherwise stated.

What is claimed is:

1. A tire tread comprising:
    a tread thickness bounded depthwise by a top side configured to engage a ground surface during tire operation and a bottom side configured to attach to a tire carcass, the thickness extending laterally between a first side edge and a second side edge and longitudinally in a lengthwise direction of the tread;
    a submerged void extending into the tread thickness from the bottom side of the tread to a terminal location spaced below the top side, the submerged void forming a submerged groove, wherein the submerged void has a width that, when exposed and in contact with the ground surface, the submerged void remains open in a footprint of the tire, and
    a plurality of projecting features arranged within the submerged void below the terminal location of the submerged void, the plurality of projecting features being further arranged in a spaced arrangement along a length of the submerged void, each of the plurality of projecting features having a width extending in a direction of the length of the submerged void, the width being greater than or equal to 3 mm and less than or equal to 10 mm, each of the plurality of projecting features extending substantially across the width of the submerged void and comprising either a wear indicator, a stone ejector, or a noise suppressor,
        where the width of the submerged void is greater than the width of each of the plurality of projecting features,
        where each of the plurality of projecting features comprises a pair of projecting members extending outwardly from opposing side walls of the submerged void, each projecting member of the pair of projecting members having a terminal end and being arranged to oppose a terminal end of the other of the pair of projecting members such that the pair of opposing members are separated by a discontinuity arranged along a length of the projecting feature, and
        where the discontinuity comprises a fracture, crack, or tear and where the discontinuity separates the terminal ends of the pair of opposing members without forming a gap.

2. The tire tread of claim 1, where the discontinuity is arranged at a location along the length of the projecting feature having a reduced cross-section.

3. The tire tread of claim 2, wherein the reduced cross-section comprises a recess formed within the projecting feature.

4. The tire tread of claim 1, where each of the plurality of projecting features narrows in cross-section as the projecting feature extends outwardly from a side wall of the submerged void.

5. A method of forming a tire tread comprising: providing a mold comprising:
    at least a first mold portion and a second mold portion operatively positionable together to form a tread-forming cavity there between corresponding to a tire tread;
    the first mold portion including a top interior side corresponding to a top side of a tread thickness configured to engage a ground surface during tire operation;
    the second mold portion including a bottom interior side corresponding to a bottom side of the tread thickness configured to attach to a tire carcass and a submerged void-forming element projecting outwardly from the bottom interior side and into the tread-forming cavity to a terminal end recessed below the top interior side to form a corresponding submerged void within the tread thickness, the submerged void-forming element having a plurality of projecting feature-forming cavities extending at least partially into a width of the submerged void-forming element for forming a plurality of corresponding projecting features extending at least partially within a width of the submerged void formed within the tread thickness;
    molding tread material arranged within the tread-forming cavity of the mold to form a molded tread, the tread having:
        a tread thickness bounded depthwise by a top side configured to engage a ground surface during tire operation and a bottom side configured to attach to a tire carcass, the thickness extending laterally between a first side edge and a second side edge and longitudinally in a lengthwise direction of the tread,
        a submerged void extending into the tread thickness from the bottom side of the tread to a terminal location spaced below the top side, the submerged void forming a groove, wherein the submerged void has a width that, when exposed and in contact with the ground surface, the submerged void remains open in a footprint of the tire, and
        a plurality of projecting features arranged within the submerged void below the terminal location of the submerged void, the plurality of projecting features being further arranged in a spaced arrangement along a length of the submerged void, each of the plurality of projecting features extending at least partially across the width of the submerged void and comprising either a wear indicator, a stone ejector, or a noise suppressor,
            where each of the plurality of projecting feature-forming cavities extend through the submerged void-forming element such that each of the projecting features formed within the molded tread in the step of molding form a continuous projecting feature extending fully across the width of the submerged void; and
    removing the molded tread from the mold whereby the submerged void-forming element is pulled through each of the plurality of projecting features to form a discontinuity comprising a fracture, crack, or tear without a gap extending across a cross-section of each projecting feature at a location along a length of the projecting feature.

6. The method of claim 5, wherein each discontinuity is formed at a location of reduced cross-section along the length of the projecting feature.

7. The method of claim 5, where each of the plurality of projecting feature-forming cavities narrow in cross-section as each of the plurality of projecting feature-forming cavities extend lengthwise into the submerged void-forming element from a side of the-submerged void-forming element.

* * * * *